(12) United States Patent
Pieussergues et al.

(10) Patent No.: US 8,099,963 B2
(45) Date of Patent: Jan. 24, 2012

(54) DEVICE FOR MOUNTING AN IGNITER PLUG IN A COMBUSTION CHAMBER OF A GAS TURBINE ENGINE

(75) Inventors: Christophe Pieussergues, Nangis (FR); Denis Jean Maurice Sandelis, Nangis (FR)

(73) Assignee: Snecma, Paris (FR)

( * ) Notice: Subject to any disclaimer, the term of this patent is extended or adjusted under 35 U.S.C. 154(b) by 387 days.

(21) Appl. No.: 12/369,224

(22) Filed: Feb. 11, 2009

(65) Prior Publication Data
US 2009/0199564 A1 Aug. 13, 2009

(30) Foreign Application Priority Data
Feb. 11, 2008 (FR) ...................................... 08 00712

(51) Int. Cl.
*F02C 7/266* (2006.01)

(52) U.S. Cl. ..................... 60/800; 60/39.827; 60/39.821
(58) Field of Classification Search .................... 60/799, 60/800, 39.821, 39.827
See application file for complete search history.

(56) References Cited

U.S. PATENT DOCUMENTS

| 3,879,940 | A | * | 4/1975 | Stenger et al. | 60/800 |
| 4,441,323 | A | * | 4/1984 | Colley | 60/800 |
| 2005/0028528 | A1 | | 2/2005 | Hernandez et al. | |
| 2006/0207258 | A1 | * | 9/2006 | Tanner et al. | 60/740 |
| 2007/0068166 | A1 | | 3/2007 | Gautier et al. | |
| 2009/0064657 | A1 | * | 3/2009 | Zupanc et al. | 60/39.821 |
| 2009/0293486 | A1 | * | 12/2009 | Hanson et al. | 60/39.821 |

FOREIGN PATENT DOCUMENTS

| EP | 1 258 682 A2 | 11/2002 |
| EP | 1 489 360 A1 | 12/2004 |
| EP | 1 770 332 A1 | 4/2007 |

\* cited by examiner

*Primary Examiner* — Ted Kim
(74) *Attorney, Agent, or Firm* — Oblon, Spivak, McClelland, Maier & Neustadt, L.L.P.

(57) ABSTRACT

The present invention relates to a device for mounting an igniter plug in a combustion chamber of a gas turbine engine contained in a casing, in which the combustion chamber has an axis YY, the mounting device comprising a hollow shaft, of axis XX, a floating igniter plug sleeve absorbing expansion along an axis perpendicular to the axis XX of the hollow shaft. The device is one which further comprises a hollow shaft sleeve such that the igniter plug sleeve is housed in the hollow shaft sleeve, and means of inclining said hollow shaft sleeve relative to the axis XX. Inclining the hollow shaft sleeve allows the chamber to be inclined relative to the axis XX.

10 Claims, 3 Drawing Sheets

DEVICE FOR MOUNTING AN IGNITER PLUG IN A COMBUSTION CHAMBER OF A GAS TURBINE ENGINE

The present invention relates to the field of gas turbine engines and relates more specifically to improving the mounting of an igniter plug in a combustion chamber.

BACKGROUND OF THE INVENTION AND DESCRIPTION OF THE PRIOR ART

In a gas turbine engine, the combustion chamber receives air from the compressor, some of which air is mixed with the fuel which is burnt in the primary combustion zone. Ignition is performed by one or two igniter plugs situated downstream of the carburetion system. Another proportion of the air bypasses the primary combustion zone and mixes with the combustion gases. All of the hot gases are then directed toward the turbine. The combustion chambers are designed to meet a certain number of essential specifications such as: in-flight re-ignition, the shape of the temperature profile, the emissions of pollutant gases and the thermal and mechanical integrity of the various components thereof.

In particular, the ignition system has to ensure in-flight re-ignition in the event that the combustion chamber is accidentally extinguished, while at the same time withstanding and resisting the thermal stresses to which is subjected. These two conditions entail arrangements that are difficult to reconcile. Specifically, the injection system produces a sheet of atomized fuel that makes a certain angle. If this angle is a very tight angle then the igniter plug is outside of the cone formed by the fuel; this is preferable from a thermal integrity standpoint but the chamber ignition capability is poor. Conversely, an injection system in which the sheet of fuel forms a very wide cone causes significant heating of that zone of the chamber that surrounds the igniter plug, because of fuel impinging on the walls and the igniter plug. This adversely affects the thermal integrity of those elements.

The present invention relates to ignition systems in which the igniter plug is mounted on the chamber via a part that forms an adapter and is itself attached to the casing of the chamber. The igniter plug extends from the casing radially toward the inside of the chamber and its end lies flush with the wall of the chamber through an opening made therein and that forms a hollow shaft. A minimum lateral clearance is formed around the igniter plug to allow relative movements between the chamber and the casing as a result of temperature variations during the various phases of flight without the igniter plug, that secured to the casing, colliding with or pressing against the edges of the opening in the wall of the chamber. The opening in the wall of the chamber forms a hollow shaft into which the igniter plug is slid and a floating igniter plug sleeve surrounding the igniter plug provides sealing between the chamber and the space between the latter and the casing. One example of this way of mounting an igniter plug in a combustion chamber using an adapter is disclosed in patent application EP 1.443.190.

An igniter the end of which protrudes too far into the combustion chamber is exposed to thermal problems. These thermal problems carry the risk of causing incorrect operation of the engine and, above all, of causing the igniter plug to be destroyed more quickly. On the other hand, if an igniter plug is set back too far from the wall of the chamber, ignition performance is degraded. Hence the need to optimize the extent to which the end of the igniter plug is immersed with respect to the wall.

The state of the art means that the axis of the igniter plug always remains perpendicular to the axis of the chamber and there is therefore no ability of the igniter plug to compensate for axial and radial expansion of the chamber.

SUMMARY OF THE INVENTION

It is an object of the invention to propose a system which allows the igniter plug to have an additional degree of freedom to avoid igniter plug wear and to transfer the points of wear onto a component that is easy to repair, thus improving the longevity of the igniter plug.

The present applicant has set itself the object of proposing an improvement to the device for mounting an igniter plug in a combustion chamber, in which the points of wear are transferred beyond the igniter plug, thus allowing repairs to be performed more easily without the need to change the igniter plug.

According to the invention, the device for mounting an igniter plug in a combustion chamber of a gas turbine engine contained in a casing, the combustion chamber having an axis YY, the mounting device comprising a hollow shaft of axis XX, a floating igniter plug sleeve absorbing expansion along an axis perpendicular to the axis XX of the hollow shaft, further comprises a hollow shaft sleeve, such that the igniter plug sleeve is housed in said hollow shaft sleeve, and means of inclining said hollow shaft sleeve relative to the axis XX, inclining the hollow shaft sleeve allowing the chamber to be inclined relative to the axis of the igniter plug.

More specifically, the inclining means comprise two diametrically opposed strips 109 on the bottom of the hollow shaft and on which the hollow shaft sleeve rests. The two strips 109 form an axis of rotation perpendicular to the plane formed by the axis of the hollow shaft and the axis of the chamber.

According to another feature the hollow shaft sleeve comprises two mutually parallel disks forming a slideway for the igniter plug sleeve. More specifically, the two disks are connected by a cylindrical wall with an exterior surface in the form of a portion of a sphere which is guided inside a wall of the hollow shaft.

According to another embodiment of the invention, the device comprises means of inclining the hollow shaft sleeve, and is one wherein the hollow shaft sleeve is mounted such that it can swivel inside the hollow shaft, allowing it a combined inclination between axial and tangential planes of the chamber, relative to the axis of the igniter plug.

According to the invention, the device further comprises means of cooling the igniter plug, these means comprising orifices pierced in the hollow shaft. The internal part of the hollow shaft is convergent to improve the cooling of the igniter plug.

The present application also relates to a gas turbine engine ignition system, comprising at least one device for mounting the igniter plug as specified hereinabove.

The present invention further relates to a gas turbine engine comprising an ignition system with at least one device for mounting the igniter plug as specified hereinabove.

BRIEF DESCRIPTION OF THE DRAWINGS

The objects, aspects and advantages of the present invention will be better understood from the following description of the various embodiments, given by way of non-limiting examples, and with reference to the attached drawings, in which.

DESCRIPTION OF THE PREFERRED EMBODIMENTS

Figure 1:
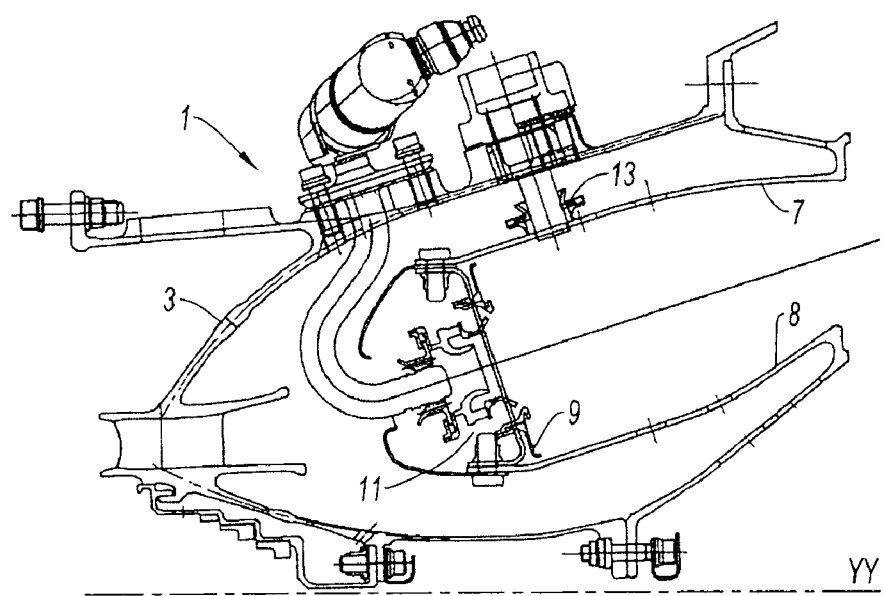
FIG. 1 shows, in longitudinal section, part of the combustion chamber of a gas turbine engine.

As may be seen in FIG. 1, the combustion chamber 1 is contained in an annular space formed by an outer casing 3. It comprises one or more external shell rings 7 with flanges or supports, one or more internal shell rings 8 with flanges, a chamber end wall 9, all associated with upstream fairings. A plurality of fuel injection pipes, distributed about the axis of the engine, open into the chamber end wall 9. Deflectors 11 form a bowl around each injection head, deflect some of the air that has entered the ducted region radially and in a swirling manner toward the atomized fuel, and thus cause a mixture of fuel with air to form. A primary combustion zone is formed downstream of the chamber end wall and in this zone the mixture is ignited by an igniter plug 13 or by several igniter plugs distributed circumferentially.

Figure 2:
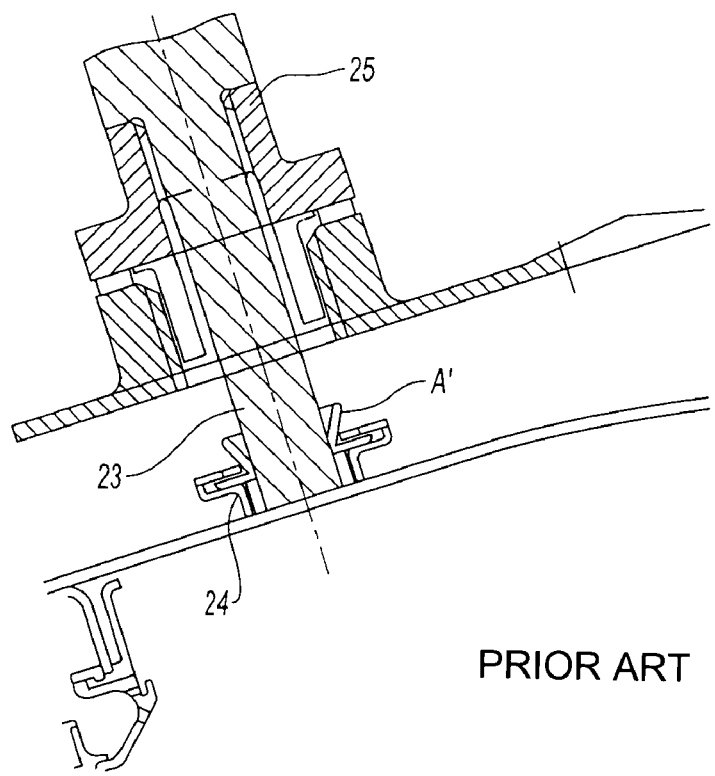
FIG. 2 shows how the igniter plug is mounted according to the prior art.

With reference to FIG. 2, an igniter plug 23 is mounted according to the prior art on the chamber via a part that forms an adapter 25 itself fixed to the casing of the chamber. The igniter plug is extended radially toward the inside of the chamber until it is flush with the wall thereof. At its other end, the igniter plug is guided in a hollow shaft 24. A floating igniter plug sleeve A' surrounding the igniter plug and comprising a flange that is radial with respect thereto slides between corresponding guide surfaces of the hollow shaft and provides sealing.

Figure 3:
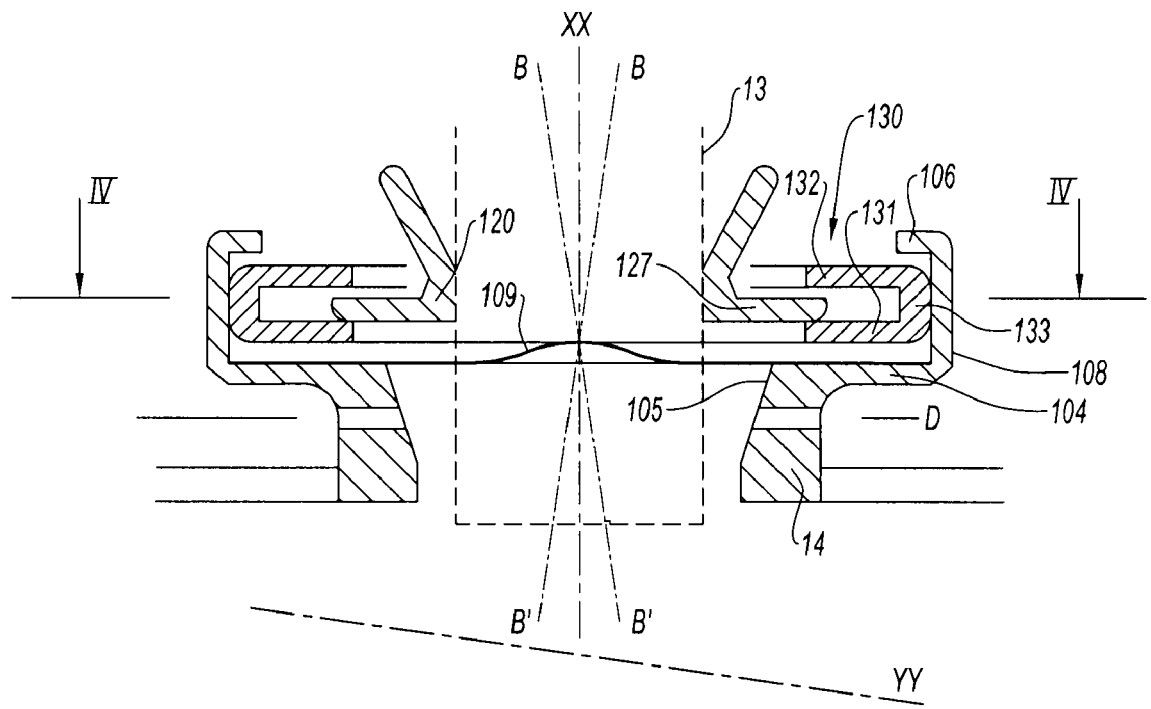
FIG. 3 shows the ignition device according to the invention, viewed in section on a plane passing through the axis YY of the chamber.

FIG. 3 shows a first embodiment of the device for mounting an igniter plug according to the invention, viewed in section on a plan passing through the axis YY of the chamber.

This device comprises a hollow shaft 14, of axis XX, which is then fixed to an opening created in the combustion chamber of axis YY. Said hollow shaft is of cylindrical shape (depicted in FIG. 4); its upper part is of a larger diameter than the remainder of the hollow shaft so as to form a flat surface 104, perpendicular to the axis thereof. A cylindrical wall 108 surrounds the flat portion 104 and the upper end 106 of the hollow shaft 14 is shaped in such a way as to form a collar perpendicular to the axis XX.

This upper part of the hollow shaft 14 houses a hollow shaft sleeve 130. This hollow shaft sleeve 130, which is in the form of a disk, follows the variations in inclination of the chamber with respect to the axis of the igniter plug.

Figure 4:
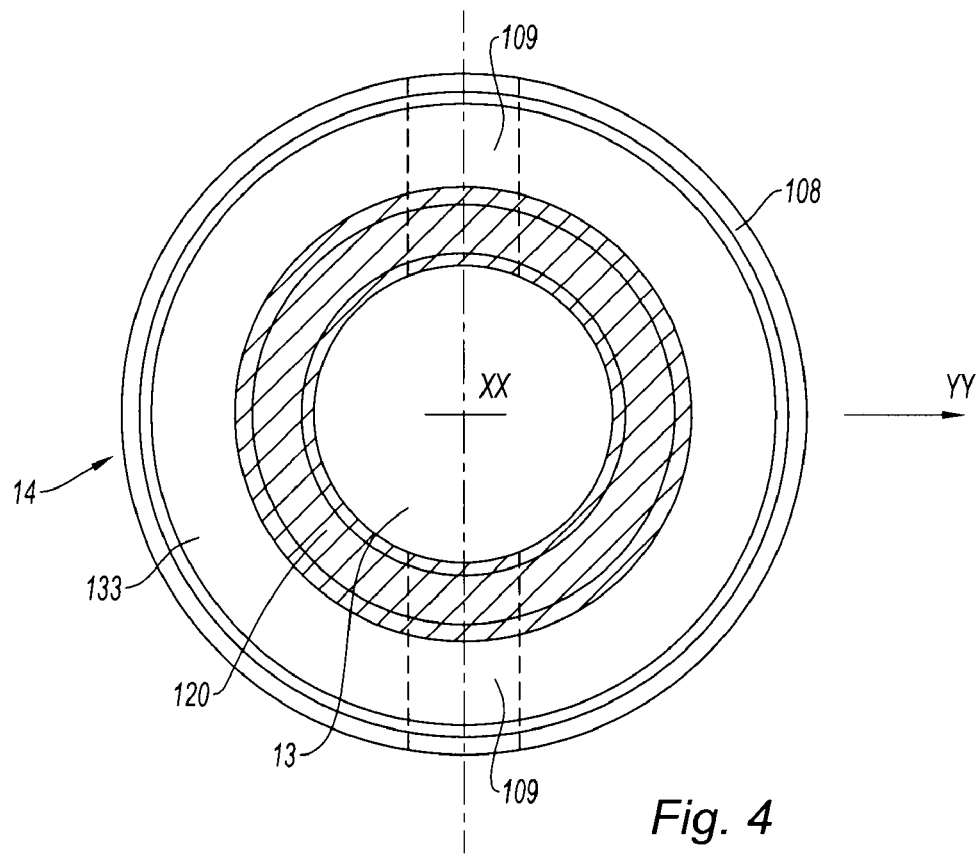
FIG. 4 shows the ignition device of FIG. 3 in section on IV-IV.

Two straight strips 109 of rounded shape are created on the flat surface 104 of the hollow shaft 14. They are directed along the diameter perpendicular to the axis YY (as depicted in FIG. 4). The rounded shape of these strips 109, on which the hollow shaft sleeve 130 rests, allows the latter to become inclined in the plane perpendicular to the axis of the igniter plug. The hollow shaft sleeve 130 comprises two mutually parallel disks 131 and 132 connected by a cylindrical wall 133 the exterior surface of which is in the form of a portion of a sphere. It is of a diameter slightly smaller than that of the cylindrical wall 108, and this allows it to remain centered on the axis with respect to the hollow shaft 14 in the event of inclination of the chamber.

Inside the hollow shaft sleeve 130, between the upper and lower disks, there is thus created a volume within which an igniter plug sleeve 120 can be housed, by way of a collar 127 of a diameter smaller than that of the hollow shaft sleeve 130. That allows the hollow shaft sleeve 120 to move and absorb the axial expansions of the chamber in the plane perpendicular to the axis XX, while the hollow shaft sleeve 130 is able to absorb variations in inclination of the chamber with respect to the axis of the igniter plug BB'. In FIG. 3, the axis BB' can become inclined with respect to the axis XX.

The upper part of the igniter plug sleeve 120 is of flared shape, converging toward the igniter plug 13, while the interior part of said sleeve surrounds the igniter plug.

The lower part of the hollow shaft 14 allows the end zone of the igniter plug to be supplied with cold air. To do this, orifices D are pierced on the lower part of the hollow shaft 14 at right angles to the axis thereof. These orifices thus allow air to be circulated in the hollow shaft. The internal part 105 of the hollow shaft 14 is shaped in such a way as to converge toward the axis XX, thus improving the cooling of the chamber through a convective effect.

FIG. 4 shows the ignition device of FIG. 3 in section on IV-IV. As may be seen, the hollow shaft 14 is of cylindrical shape, just like the hollow shaft sleeve 130, which fits into said hollow shaft. The igniter plug sleeve 120 is nested inside the hollow shaft sleeve 130. The cylindrical empty space between the outside diameter of the igniter plug sleeve 120 and the wall 133 of the hollow shaft sleeve 130 shows that the igniter plug sleeve 120 has a certain degree of freedom to move within that other sleeve. That allows the igniter plug sleeve 120 to absorb axial expansions of the chamber along an axis perpendicular to the axis XX of the hollow shaft 14. The igniter plug 13 is mounted in the igniter plug sleeve 120. We must also note the positioning of the two straight strips 109 formed at the bottom of the hollow shaft 14 on the diameter perpendicular to the axis YY.

Figure 5:
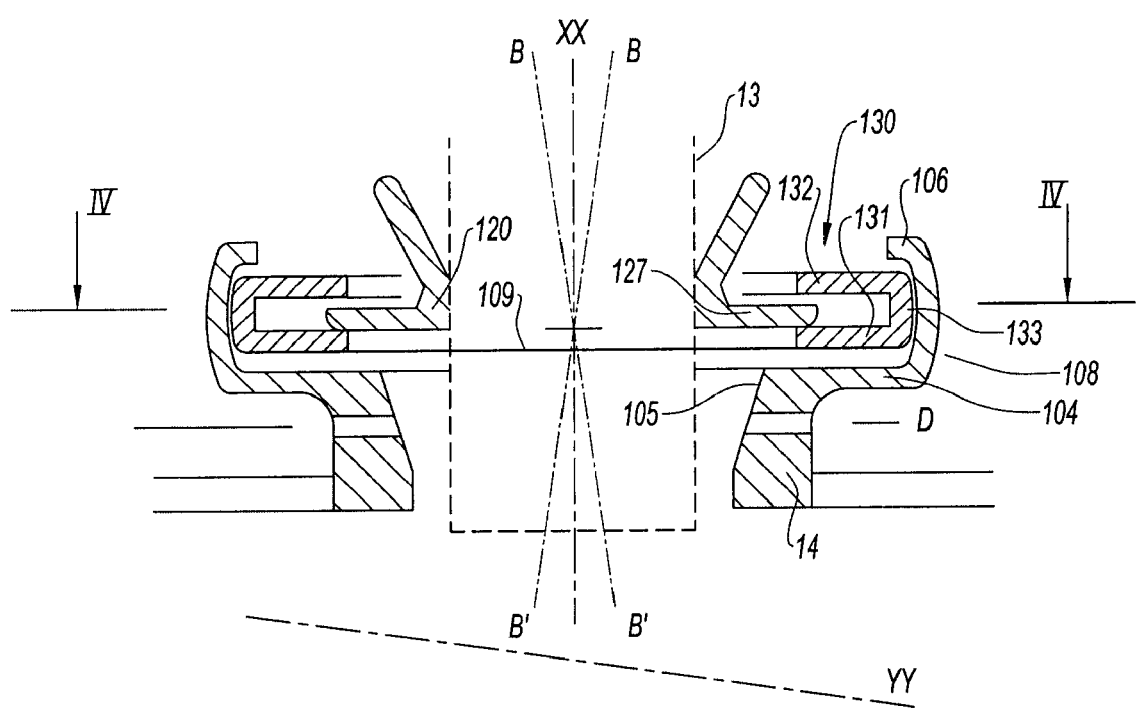
FIG. 5 shows the ignition device according to another embodiment of the invention, viewed in section on a plane passing through the axis YY of the chamber.

In a second embodiment shown in FIG. 5, the strips 109 formed on the bottom of the hollow shaft 14 are omitted, the wall of the hollow shaft adopts a spherical shape of a radius slightly greater than that of the wall of the hollow shaft sleeve 130. The hollow shaft sleeve 130 is thus mounted such that it can swivel in the spherical wall of the hollow shaft 14, and its spherical edges allow it to slide along this wall as the chamber becomes inclined with respect to the axis of the igniter plug. According to this embodiment, the hollow shaft sleeve 130 is able to absorb combined variations in inclination between axial and tangential planes of the chamber with respect to the axis of the igniter plug.

The invention claimed is:

1. A device for mounting an igniter plug in a combustion chamber of a gas turbine engine contained in a casing, the combustion chamber having an axis YY, the mounting device comprising a hollow shaft of axis XX, a floating igniter plug sleeve absorbing expansion along an axis perpendicular to the axis XX of the hollow shaft, which device comprises a hollow shaft sleeve, such that the igniter plug sleeve is housed in the hollow shaft sleeve, and means of inclining said hollow shaft sleeve relative to the axis XX, inclining the hollow shaft sleeve allowing the chamber to be inclined relative to the axis of the igniter plug.

2. The device for mounting an igniter plug as claimed in claim 1, wherein the inclining means comprise two diametrically opposed strips on the bottom of the hollow shaft and on which the hollow shaft sleeve rests.

3. The device for mounting an igniter plug as claimed in claim 1, wherein the hollow shaft sleeve comprises two mutually parallel disks forming a slideway for the igniter plug sleeve.

4. The mounting device as claimed in claim 3, of which the two disks are connected by a cylindrical wall with an exterior surface in the form of a portion of a sphere which is guided inside a wall of the hollow shaft.

5. The device for mounting an igniter plug as claimed in claim 1, wherein the hollow shaft sleeve is mounted such that it can swivel inside the hollow shaft.

6. The device for mounting an igniter plug as claimed in claim 1, which comprises means of cooling the igniter plug.

7. The device for mounting an igniter plug as claimed in claim 6, wherein the cooling means comprise orifices pierced in the hollow shaft.

8. The device for mounting an igniter plug as claimed in claim 6, wherein the internal part of the hollow shaft is convergent to improve the cooling of the igniter plug.

9. A gas turbine engine ignition system comprising at least one device for mounting an igniter plug as claimed in one of claims 1 to 8.

10. A gas turbine engine comprising an ignition system with at least one device for mounting the igniter plug as claimed in one of claims 1 to 8.

* * * * *